R. JONES, Dec'd.
E. H. JONES & H. D. STRAW, Adm'rs.

COAL-BREAKING ROLLS.

No. 171,140.                               Patented Dec. 14, 1875.

Scale of Inches.

WITNESSES:                 INVENTOR:
J. H. Bowden              Richard Jones, Dec'd
                       BY { Edwin H. Jones }  ADMINISTRATORS
                            { H. D. Straw   }

UNITED STATES PATENT OFFICE.

EDWIN H. JONES AND HENRY D. STRAW, OF WILKESBARRE, PENNSYLVANIA, ADMINISTRATORS OF RICHARD JONES, DECEASED.

IMPROVEMENT IN COAL-BREAKING ROLLS.

Specification forming part of Letters Patent No. 171,140, dated December 14, 1875; application filed January 2, 1875.

*To all whom it may concern:*

Be it known that RICHARD JONES, deceased, late of Wilkesbarre, county of Luzerne and State of Pennsylvania, invented certain Improvements in Coal-Breaking Machines, of which the following is a specification:

This invention relates to the construction of the toothed rolls of coal-breaking machines; and the object of the invention is to provide the rolls with durable teeth, which can be readily removed and replaced. This object is attained in the manner which we will now proceed to describe, reference being had to the accompanying drawing, in which—

Figure 1:
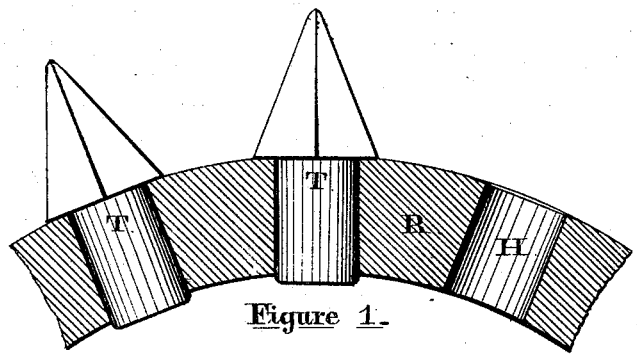
Figure 3:
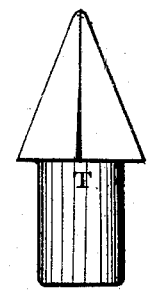
Figure 2:
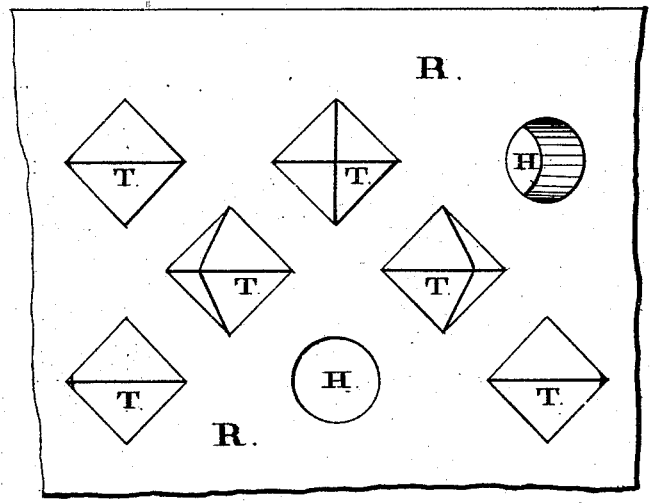

Figure 1 is a transverse section of a coal-breaking roll made in accordance with this invention; Fig. 2, a plan view, and Fig. 3 a view of one of the teeth.

Through the cast-iron shell or cylinder R are bored a number of holes, H, for receiving the shanks of the teeth T, the latter being made of steel or of wrought-iron tipped with steel. The cylindrical shank of each tooth is accurately turned with a very slight taper, the shank terminating in a shoulder, which is also accurately turned. Each hole in the cast-iron cylinder, after being bored, is carefully reamed, and so adapted to the shank of the tooth that considerable force will be required in driving them home, the driving being continued until the shoulder bears against the roll, and the portion of the latter against which the shoulder bears being faced by a proper tool, so as to form a true bearing for the said shoulder. The teeth thus secured to the roll will retain their positions with a tenacity due to the force applied to drive the shanks into the holes, and any one or more of the teeth can be removed first by blows imparted to the rounded ends of the shanks, which project through the cylinder, and afterward by a suitable instrument held against the end of the shank and struck by a hammer.

We wish it to be distinctly understood that we do not claim, broadly, as the invention of the said RICHARD JONES a coal-breaking machine with detachable teeth; but

We claim as his invention—

The within-described coal-breaking roll, consisting of a hollow cast-iron cylinder, combined with wrought-iron or steel teeth, the turned shanks of which are so driven into holes bored through the said cylinder that they will retain their places therein, but can be driven therefrom from the inside of said cylinder, all as set forth.

EDWIN H. JONES,
H. D. STRAW,
*Administrators.*

Witnesses:
J. H. BOWDEN,
JOHN R. EDGAR.